United States Patent
Van Diggelen et al.

(10) Patent No.: US 10,459,089 B2
(45) Date of Patent: Oct. 29, 2019

(54) ADAPTIVE POSITIONING SYSTEM

(71) Applicant: BROADCOM CORPORATION, Irvine, CA (US)

(72) Inventors: Frank Stephen Tromp Van Diggelen, San Jose, CA (US); Steve Graham Mole, San Jose, CA (US); Vladimir Belov, Fremont, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 346 days.

(21) Appl. No.: 15/263,086

(22) Filed: Sep. 12, 2016

(65) Prior Publication Data

US 2017/0074989 A1    Mar. 16, 2017

Related U.S. Application Data

(60) Provisional application No. 62/217,657, filed on Sep. 11, 2015.

(51) Int. Cl.
| | |
|---|---|
| *G01S 19/49* | (2010.01) |
| *G01S 19/48* | (2010.01) |
| *G01C 21/16* | (2006.01) |
| *G01S 19/23* | (2010.01) |
| *G01C 21/12* | (2006.01) |

(52) U.S. Cl.
CPC ............ *G01S 19/49* (2013.01); *G01C 21/165* (2013.01); *G01S 19/48* (2013.01); *G01C 21/12* (2013.01); *G01S 19/23* (2013.01)

(58) Field of Classification Search
CPC .......... G01S 19/49; G01S 19/48; G01S 19/23; G01C 21/12; G01C 21/165
USPC ....................... 342/357.31, 357.32
See application file for complete search history.

(56) References Cited

U.S. PATENT DOCUMENTS

| | | | | |
|---|---|---|---|---|
| 8,150,624 B2 * | 4/2012 | Berardi | ................. | A61B 5/1112 701/472 |
| 8,214,139 B2 * | 7/2012 | Yonker | ................. | H04W 4/029 701/470 |
| 8,374,785 B2 * | 2/2013 | McBurney | ............. | G01C 21/12 701/472 |
| 9,332,476 B2 * | 5/2016 | Shatsky | ............... | G01C 21/165 |

(Continued)

*Primary Examiner* — Chuong P Nguyen
(74) *Attorney, Agent, or Firm* — Morgan, Lewis & Bockius LLP

(57) ABSTRACT

A device implementing an adaptive positioning system may include at least one processor that is configured to concurrently implement a first positioning system that generates first positioning information items and a second positioning system that generates second positioning information items. The processor may be configured to buffer the second positioning information items generated by the second positioning system and to determine a position estimation for the device based on the first positioning information items generated by the first positioning system. The processor may be configured to detect a degradation in a quality of the first positioning system. The processor may be configured to, in response to detecting the degradation in the quality of the first positioning system, determine the position estimation for the device based at least in part on at least one of the buffered second positioning information items generated by the second positioning system.

20 Claims, 8 Drawing Sheets

(56) References Cited

U.S. PATENT DOCUMENTS

| | | | |
|---|---|---|---|
| 9,410,808 B2* | 8/2016 | Park | G01C 21/00 |
| 9,544,871 B2* | 1/2017 | Le Grand | G01S 5/0252 |
| 10,051,434 B2* | 8/2018 | Chang | H04W 4/043 |
| 10,274,346 B2* | 4/2019 | Le Grand | G01D 9/00 |
| 2009/0192709 A1* | 7/2009 | Yonker | H04W 4/029 |
| | | | 701/470 |
| 2016/0003949 A1* | 1/2016 | Venkataraman | G01S 19/22 |
| | | | 342/357.29 |
| 2016/0349362 A1* | 12/2016 | Rohr | G01S 13/86 |
| 2017/0023659 A1* | 1/2017 | Bruemmer | G01S 5/0252 |

* cited by examiner

ADAPTIVE POSITIONING SYSTEM

CROSS-REFERENCE TO RELATED APPLICATION

This application claims the benefit of U.S. Provisional Application No. 62/217,657, entitled "CONCURRENT POSITION FILTERS," filed Sep. 11, 2015, the entirety of which is incorporated herein by reference.

TECHNICAL FIELD

The present description relates generally to a positioning system, including an adaptive positioning system that maintains multiple concurrent position filters that can be adaptively switched between.

BACKGROUND

In a global navigation satellite system (GNSS), a system of satellites provides geo-spatial position with global coverage. The satellites may provide positioning signals that may be used by devices that can receive the positioning signals to determine location, velocity, and/or time.

BRIEF DESCRIPTION OF THE DRAWINGS

Certain features of the subject technology are set forth in the appended claims. However, for purpose of explanation, one or more implementations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1:
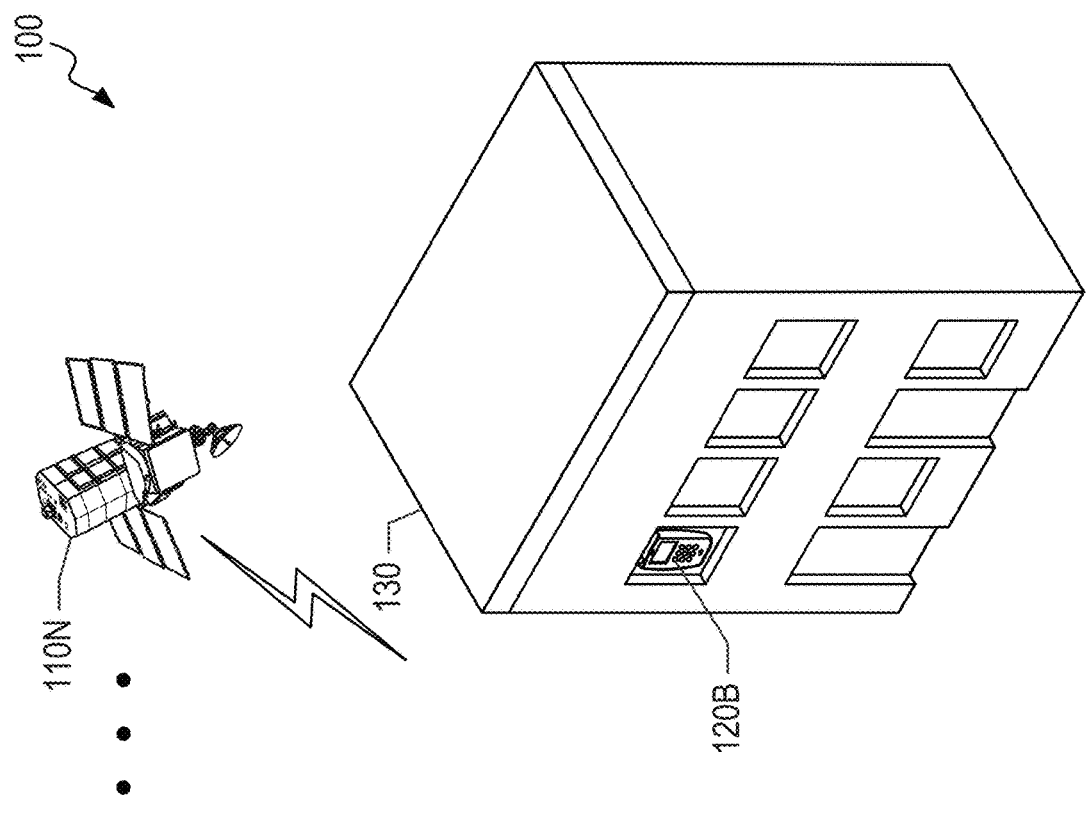
FIG. 1 illustrates an example GNSS environment in which an adaptive positioning system may be implemented in accordance with one or more implementations.

FIG. 1 illustrates an example GNSS environment 100 in which an adaptive positioning system may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The GNSS environment 100 includes one or more electronic devices 120A-B, one or more positioning satellites 110A-N, and a building 130. The positioning satellites 110A-N may be satellites that orbit Earth and transmit, or broadcast, one or more positioning or ranging signals to Earth. The positioning satellites 110A-N may be part of one or more GNSSs, such as a global positioning system (GPS), a Global Navigation Satellite System (GLONASS), a Galileo GNSS, a BeiDou Navigation Satellite System, a Compass navigation system, or generally any GNSS. One or more of the positioning signals that are transmitted by the positioning satellites 110A-N may be received by one or more devices that include radios for receiving the positioning signals, such as one or more of the electronic devices 120A-B.

The electronic devices 120A-B can be computing devices such as laptop computers, smartphones, wearable devices (e.g., smartwatch, smartglasses, etc.), receivers, user equipment, or generally any electronic devices. One or more of the electronic devices 120A-B may utilize one or more wireless networking technologies, such as Bluetooth, Zigbee, Bluetooth Low Energy, Wi-Fi, 802.11ad, 802.11aq, 802.11/a/b/g/n/ac/ax, or generally any wireless networking technology. One or more of the electronic devices 120A-B may include a radio for receiving GNSS signals, such as a GPS radio, a GLONASS radio, a Galileo radio, a BeiDou radio, a Compass radio, or generally any GNSS radio. One or more of the electronic devices 120A-B may include all or part of the electronic system discussed further below with respect to FIG. 5.

The electronic devices 120A-B may receive positioning signals transmitted by one or more of the positioning satellites 110A-N, and may use the received positioning signals to determine respective positioning information corresponding to the electronic devices 120A-B, such as location, velocity and/or time. In one or more implementations, the electronic devices 120A-B may receive positioning signals transmitted by the positioning satellites 110A-N while located in, and/or moving between, various environments, such as indoor environments, outdoor environments, etc. Certain environments, such as an indoor environment, may block, reflect, or otherwise interfere with the positioning signals transmitted by one or more of the positioning satellites 110A-N.

In FIG. 1, the electronic device 120A is illustrated as being in an outdoor environment, and may, in one or more implementations, receive one or more positioning signals transmitted by one or more of the positioning satellites 110A-N without substantial interference, e.g. the one or more positioning signals received by the electronic device 120A may have a high signal to noise ratio (SNR). The electronic device 120B is illustrated as being in an indoor environment, inside the building 130, which may interfere with one or more of the positioning signals transmitted by one or more of the positioning satellites 110A-N, e.g. the one or more positioning signals received by the electronic device 120B may have a low SNR. Example SNRs of positioning signals received across multiple different environments are discussed further below with respect to FIG. 5.

Thus, when the electronic device 120A changes environments from the outdoor environment to the indoor environment, the electronic device 120A may be unable to properly receive one or more of the positioning signals from one or more of the positioning satellites 110A-N. The electronic device 120A may be able to detect a change in environment based on, for example, interference detected in the positioning signals received from the positioning satellites 110A-N, reception of signals transmitted by wireless access points and/or other wireless devices located within the building, and/or generally any information that is available to the electronic device 120A.

Upon detecting a change in environment, such as by determining that one or more of the positioning signals from one or more of the satellites 110A-N is not being properly received, the electronic device 120A may switch from determining positioning information using one or more of the positioning signals transmitted by the one or more satellites 110A-N to determining positioning information using another positioning system that does not rely on one or more of the positioning signals transmitted by the one or more satellites 110A-N, such as a pedestrian or personal dead reckoning (PDR) positioning system, an indoor positioning system, a WiFi positioning system, a location beacon positioning system, or generally any positioning system that does not wholly rely on one or more of the positioning signals transmitted by the one or more satellites 110A-N.

In the PDR positioning system, a current position is determined from a previously determined position based on an estimated speed, acceleration, and/or direction traveled over a period of time after having determined the previous position. Thus, one or more the electronic devices 120A-B implementing the PDR positioning system may include one or more sensors and/or circuits that may be used to determine an estimated speed, acceleration, and/or direction being traveled, such as an accelerometer, a rate gyroscope, a magnetometer, a compass, and the like. In one or more implementations, when the electronic device 120A switches from using a GNSS to determine positioning information to using a PDR system to determine positioning information, the PDR system may be initialized with the last position determined from the GNSS. Thus, the PDR system may start determining positioning information based on the last position determined from the GNSS.

However, as the electronic device 120A approaches the building 130, the one or more positioning signals received from the one or more positioning satellites 110A-N by the electronic device 120A may exhibit multipath characteristics due to the reflection of the one or more positioning signals off of the building 130. The reflected signals may cause the electronic device 120A to determine positioning information which gives the appearance that the electronic device 120A is moving away from the building 130 even though the electronic device 120A is actually approaching the building 130. Thus, the last positioning information determined from the GNSS, which is the first positioning information used by the PDR system, may be inaccurate, which may cause subsequent positioning information determined from the PDR system to also be inaccurate.

In the subject system, one or more of the electronic devices 120A-B may concurrently determine positioning information using multiple positioning systems across multiple environments, such as the indoor environment and the outdoor environment. The positioning systems may utilize parallel state filters, such as Kalman state filters, or position filters, that generate states of the positioning systems that may be reflective of an estimated position of the one or more of the electronic devices 120A-B. The state filters may use a series of measurements observed over time, that may contain statistical noise and/or other inaccuracies, and produce positioning information, such as location estimates. For example, the state filters may use Bayesian inference and estimate a joint probability distribution over the variables for each timeframe. The positioning information may be batched or buffered such that positioning information generated by the positioning systems may be stored for a period of time. For example, the system may buffer and continuously refresh positioning information generated by a positioning system over a period of time, such as the last ten seconds, or over a number of states, such as the last ten states.

In the subject system, when the electronic device 120A determines that it is transitioning from one environment to another, e.g. entering the building 130, the electronic device 120A switches from using one positioning system, such as the GNSS, to using another positioning system, such as a PDR system. However, to account for the reflection of one or more of the positioning signals transmitted by one or more of the satellites 110A-N as the electronic device 120A approaches the building 130, the PDR system may be initialized using buffered positioning information that was generated by the GNSS before the reflection of the positioning signals began. The buffered positioning information previously generated by the PDR system may then be used to update the initialized PDR system to the current position of the electronic device 120A. For example, the positioning information buffered for the PDR system at the time of the generation of the GNSS positioning information used to initialize the PDR system until the present time may be sequentially fed back into the PDR system to update the PDR system to the current accurate position of the electronic device 120A.

Thus, by using the buffered positioning information that was generated by the GNSS before the reflection of the positioning signals began and the buffered positioning information subsequently generated by the PDR system, the switch from the GNSS to the PDR system can effectively occur before the electronic device 120A actually changes environments, e.g. before the electronic device 120A enters the building 130. In this manner, the electronic device 120A can initialize the PDR system with accurate positioning information generated by the GNSS, e.g. before the positioning signals began reflecting off of the building 130, and update the PDR system to the current location of the electronic device 120A, e.g. based on the buffered information items previously generated by the PDR system.

For explanatory purposes, the multiple concurrent positioning systems are described as being a GNSS and a PDR system, the former of which may perform better in an outdoor environment than an indoor environment. However, the subject system may also utilize one or more positioning systems that may perform better in an indoor environment than an outdoor environment, such as an indoor positioning system, or may generally utilize any number of concurrent positioning systems.

Figure 2A:
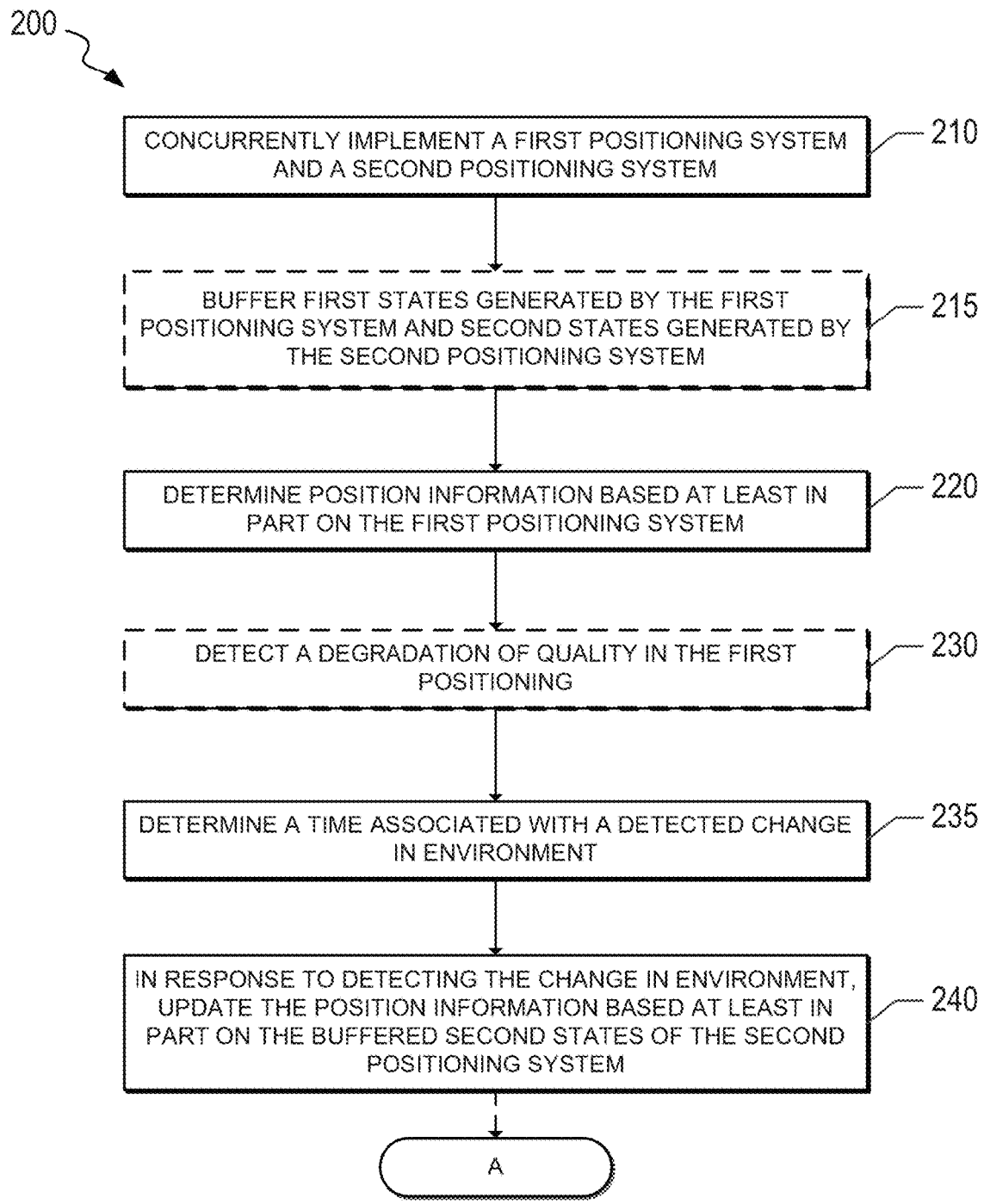
FIGS. 2A and 2B illustrate a flow diagram of an example process of an adaptive positioning system in accordance with one or more implementations.

FIG. 2A illustrates a flowchart of an example process 200 of an adaptive positioning system in accordance with one or more implementations. For explanatory purposes, the example process 200 is primarily described herein with reference to the electronic device 120A of the environment 100 of FIG. 1. However, the example process 200 is not limited to the electronic device 120A, and one or more blocks of the example process 200 may be performed by one or more components of the electronic device 120A, such as one or more of the components described further below with respect to the electronic system of FIG. 5. Further for explanatory purposes, the blocks of the example process 200 are described herein as occurring in serial, or linearly. However, multiple blocks of the example process 200 may occur in parallel. In addition, the blocks of the example process 200 need not be performed in the order shown and/or one or more of the blocks of the example process 200 need not be performed.

In the example process 200, the electronic device 120A concurrently determines positioning information from both a first positioning system and a second positioning system (210). In one or more implementations, each of the first and second positioning systems may utilize a state filter, such as a Kalman state filter. The location determination accuracy may be enhanced when position and velocity history for each of the positioning systems is captured using a state filter. Maintaining two or more parallel state filters (for the two positioning systems) allows for switching between multiple positioning systems (and the corresponding state filters) to account for changes in conditions which may affect location accuracy, such as changing environments.

The first positioning system may be a positioning system that works well when in an first environment, such as outdoors but may not work as well when in a second environment, such as indoors, such as the GNSS. The second positioning system may be a positioning system that works better than the first positioning system when in the second environment, such as indoors, but may not work as well as the first positioning system when in the first environment, such as outdoors. For example, the first positioning system may be a GNSS and the second positioning system may be a PDR system. In one or more implementations, the PDR system may be initialized and/or periodically updated with positioning information determined by the GNSS, such as when one or more of the positioning signals are received from one or more of the positioning satellites 110A-N with a signal strength that satisfies a signal strength threshold.

The electronic device 120A may buffer (or batch) the first positioning information determined by the first positioning system and/or the second positioning information determined by the second positioning system (215). For example, first states may be batched (or buffered) from a first state filter used by the first positioning system and second states may be batched (or buffered) from a second state filter used by the second positioning system. In one or more implementations, the electronic device 120A may buffer or batch a number of states for one or more of the state filters, which may correspond to a predetermined window of time. Thus, the electronic device 120A may effectively track and/or buffer over time a first position and/or location determined by the first positioning system and a second position and/or location determined by the second positioning system.

While in a first environment, such as outdoors, the electronic device 120A may determine a current position, or location, based at least in part on the first positioning system, such as the GNSS (220). The electronic device 120A may then detect a change in environment and/or may detect a degradation in the quality of the first positioning system (230). For example, a change in environment may be detected based at least in part on a detection of multipath signals or signal interference in one or more of the positioning systems, such as GNSS. Alternatively, the change may be detected based on an improvement of signal quality in one or more of the positioning systems, such as when the electronic device 120A exits the building 130 and the GNSS signal quality improves. The change in environment may correspond to change in conditions which affect the quality of the positioning systems. For instance, even if the electronic device 120A remains indoors, the signal quality of GNSS may improve such that GNSS may be usable indoors.

The degradation of quality in the first positioning system may be detected by GNSS receivers based on satellite signal strength monitoring and/or other filter metrics. For instance, an average signal-to-noise ratio (SNR) of signals from the satellites 110A-N may be compared against one or more thresholds. If the average SNR is equal to or above an outdoor threshold, the electronic device 120A may determine that it is outdoors, and if the average SNR is below the outdoor threshold, the electronic device 120A may determine that it is indoors. The one or more thresholds may be based on predetermined values, filtered SNR values, and/or a combination, such as a filtered SNR plus a predetermined width value. The degradation may also be detected based on determining an improved quality of another positioning system. For instance, a PDR system may accumulate small errors over time such that each successive positioning information (and/or state) determined by the PDR system cumulatively adds an error amount. If the reception of the GNSS positioning signals improve, such as beyond the threshold SNR, then a difference between the GNSS positioning information and the PDR positioning information may indicate degradation of the quality of PDR system.

In one or more implementations, if the positioning information determined by the first positioning information differs from the positioning information determined by the second positioning system by more than a threshold amount, then the electronic device 120A may determine that a change in environment has occurred and/or is about to occur. For example, as the electronic device 120A approaches the building 130, and the positioning information determined by the GNSS begins to move away from the building 130 due to the reflections of the positioning signals off of the building 130, the difference between the positioning information determined by the respective systems may increase.

The electronic device 120A determines a change time corresponding to when the detected change in environment and/or degradation in quality of the first positioning system occurred (235). In response to detecting the change in environment and/or the degradation in quality of the first positioning system, the electronic device 120A updates its current position based at least in part on the buffered positioning information (and/or states) determined by the second positioning system prior to the change time (240).

For example, if the electronic device 120A moved from outdoors to indoors, the last positioning information (and/or state) determined by the second positioning system before the degradation in signal quality of the positioning signals may be used. If the electronic device 120A moved from indoors to outdoors, the last state before GNSS improved may be used. The electronic device 120A may then propagate out the subsequent positioning information and/or states determined by the second positioning system from the last state.

Figure 2B:
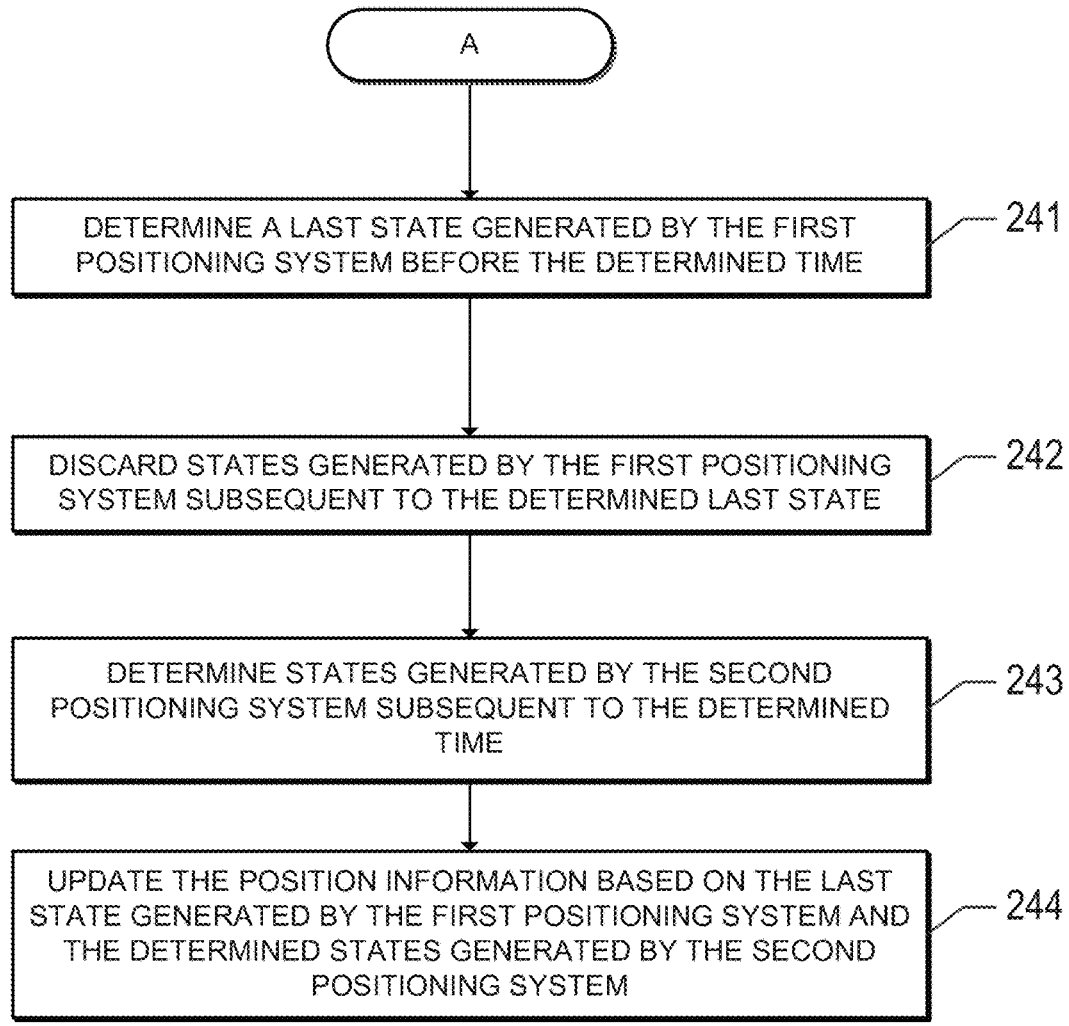

Optionally, the example process 200 may continue to FIG. 2B, and the electronic device 120A may determine a last state generated by the first positioning system before the determined time corresponding to the detected change in the environment (241). The last state may represent the last valid or good state generated by the first positioning system before the degradation in the quality of the system, for example, caused by a change in environment. The electronic device 120A then discards any states generated by the first positioning system subsequent to the determined last state, as these states are presumed to be inaccurate (242).

The electronic device 120A determines one or more states generated by the second positioning system subsequent to the determined time corresponding to the detected change in the environment (243). The electronic device 120A then updates position information for the electronic device 120A based at least in part on the last state generated by the first positioning system and the determined states generated by the second positioning system (244). For example, the electronic device 120A may use the last state determined by the first positioning system, e.g. the GNSS, to re-initialize the second positioning system, e.g. the PDR system. The determined states of the PDR system corresponding to the time from the last state until the current state, are used to update the location values and determine the current location of the electronic device 120A. In one or more implementations, the current position may be determined without the buffered positioning information, such as when the electronic device 120A moves from indoors to outdoors.

Although the above description describes using two concurrent positioning system, more than two positioning systems may be used in accordance with one or more implementations.

Figure 3A:
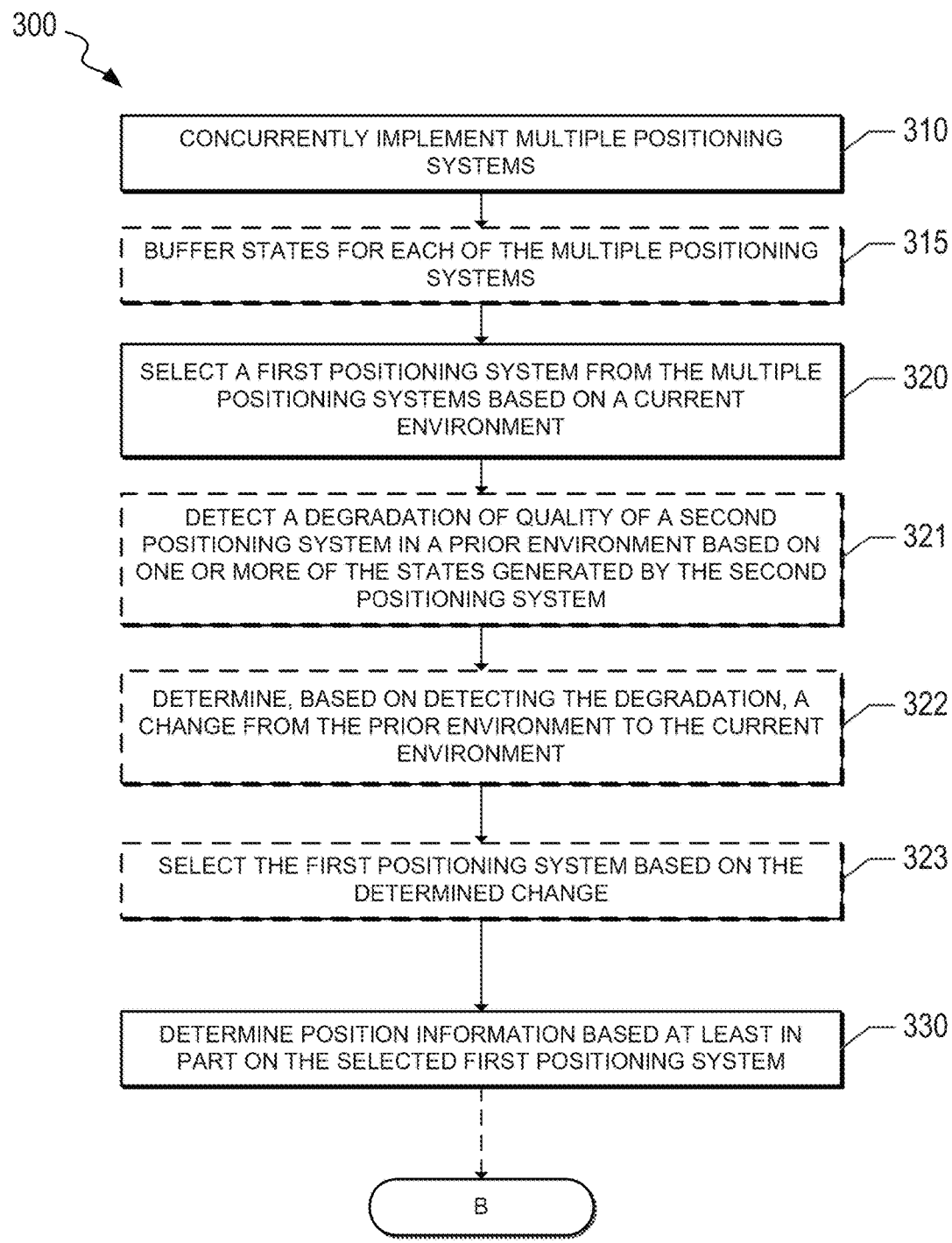
FIGS. 3A and 3B illustrate a flow diagram of another example process of an adaptive positioning system in accordance with one or more implementations.
Figure 3B:
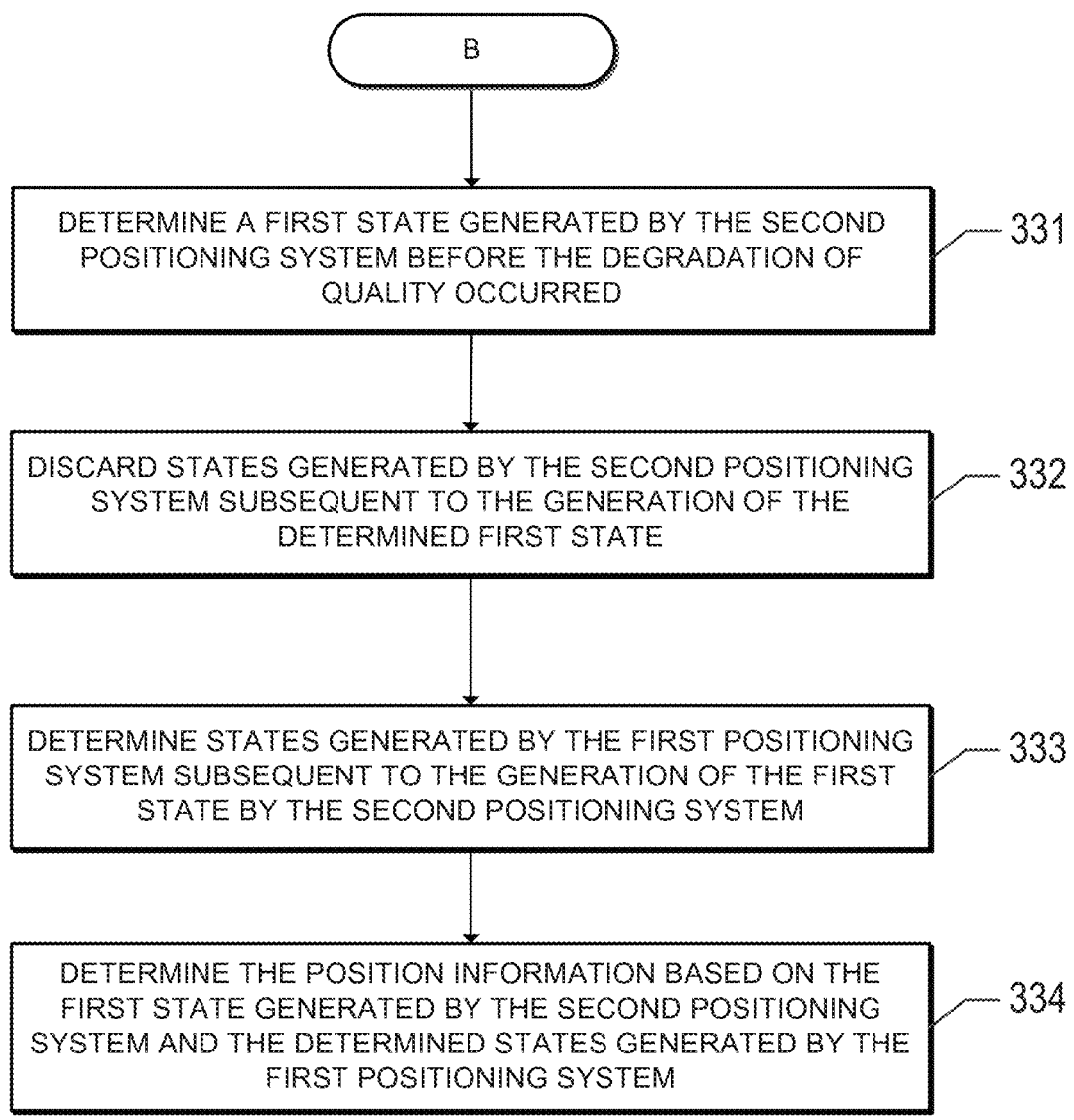

FIG. 3A illustrates a flowchart of an example process 300 for implementing concurrent positioning systems in accordance with one or more implementations. For explanatory purposes, the example process 300 is primarily described herein with reference to the electronic device 120A of the environment 100 of FIG. 1. However, the example process 300 is not limited to the electronic devices 120A, and one or more blocks of the example process 300 may be performed by one or more components of the electronic device 120A, such as one or more of the components described further below with respect to the electronic system of FIG. 5. Further for explanatory purposes, the blocks of the example process 300 may occur in parallel. In addition the blocks of the example process 300 need not be performed in the order shown and/or one or more of the blocks of the example process 300 need not be performed.

In the example process 300, the electronic device 120A concurrently implements multiple positioning systems (310). The positioning systems may include a GNSS, a PDR system, and/or other positioning systems. The electronic device 120A may buffer (or batch) states generated by each of the multiple positioning systems (315). The electronic device 120A may buffer a limited number of states generated by each positioning system, which may correspond to a predetermined window of time.

The electronic device 120A selects a first positioning system from the multiple positioning systems based on a current environment (320). The electronic device 120A may select the positioning system providing the most accurate position estimation based on current conditions detected by or known by the electronic device 120A, and/or the electronic device 120A may select a default positioning system which may be the most accurate during common conditions. The electronic device 120A may also select the positioning system by detecting a degradation of quality of a second positioning system (e.g., a currently used positioning system) in a prior environment based on one or more of the states generated by the second positioning system (321).

The electronic device 120A may determine, based on detecting the degradation, a change from the prior environment to the current environment (322). As stated above, the electronic device 120A may use signal analysis or other methods to determine the change in environment, in accordance with one or more implementations. The electronic device 120A may select the first positioning system from the multiple positioning systems based on the determined change (323). The electronic device 120A may identify the current environment and select the positioning system best suited for the current environment, or may select a positioning system which did not exhibit degradation of quality. The electronic device 120A determines position information at least in part on the selected first positioning system (330).

The electronic device 120A may determine the position information by determining a first state generated by the second positioning system before the degradation of quality occurred (331). The electronic device 120A may discard and/or disregard states generated by the second positioning system subsequent to the generation of the determined first state (332). The electronic device 120A may determine states generated by the first positioning system subsequent to the generation of the first state by the second positioning system (333). The electronic device 120A may determine the position information based on the first state generated by the second positioning system and the determined states generated by the first positioning system (334).

Figure 4:
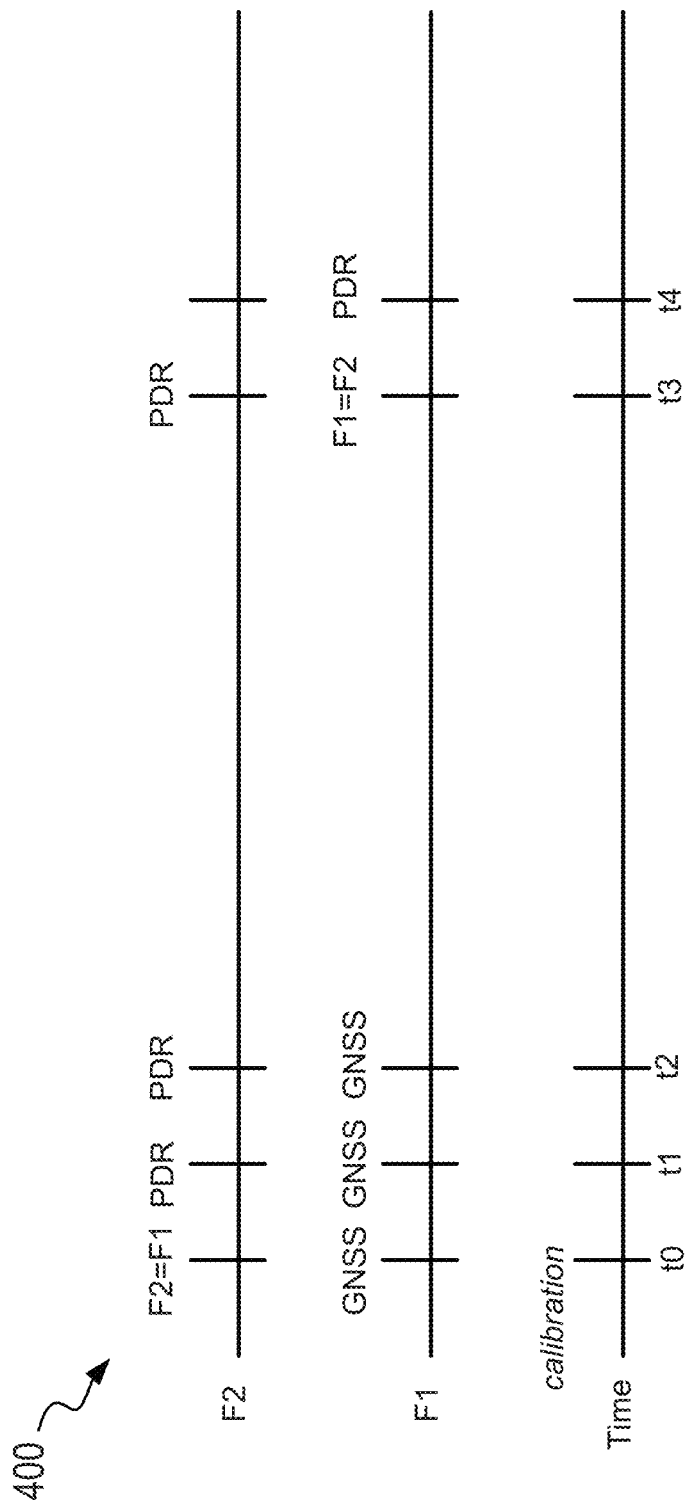
FIG. 4 illustrates an example timing diagram of two concurrent positioning systems in accordance with one or more implementations.

FIG. 4 illustrates an example timing diagram 400 of two concurrent positioning systems in accordance with one or more implementations. In the example timing diagram 400, a first filter F1 may be implemented by a GNSS positioning system and a second filter F2 may be implemented by a PDR system. F1 may be the active or selected filter for determining current location. At time t0, the filters are calibrated and initialized. F1 uses an initial GNSS location, and F2 also uses the initial GNSS location. At time t1, F1 uses an updated GNSS location and F2 uses a location dead reckoned from the previous location. For example, the electronic device 120A may have entered the building 130 between time t2 and t3 in FIG. 4. For example, in FIG. 4, at time t3 F1 uses the PDR location value determined at t3, and continues with PDR at t4. In FIG. 4, F2 becomes redundant. In one or more implementations, at time t3 the filter F2 may continue to be used for positioning and the filter F1 may be considered redundant.

Figure 5:
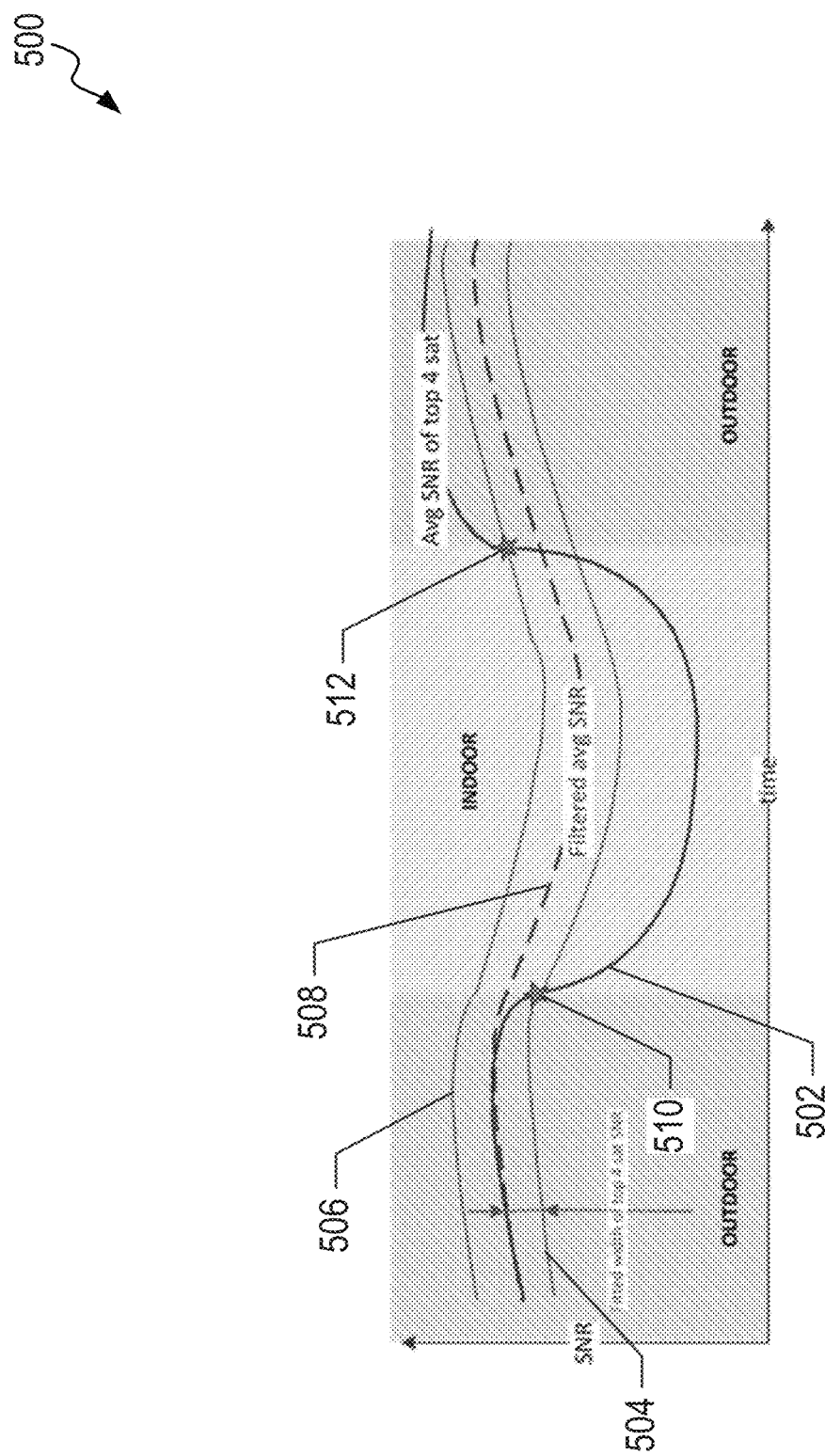
FIG. 5 illustrates an example graph of average signal to noise ratios of received positioning signals in multiple different environments in accordance with one or more implementations.

FIG. 5 illustrates an example graph 500 of average signal to noise ratios of received positioning signals in multiple different environments, such as an indoor environment and an outdoor environment, in accordance with one or more implementations. A signal-to-noise ratio (SNR) of received satellite signals may be monitored over time, such as by the electronic device 120A. The satellite signals may be received from one or more of the positioning satellites 110A-N and are primarily described herein with reference to the positioning satellites 110A-N, but are not limited to the positioning satellites 110A-N. The graph 500 shows an average SNR signal 502, a lower boundary 504, an upper boundary 506, a filtered average SNR signal 508, a first transition 510, and a second transition 512.

The average SNR signal 502 corresponds to a present signal quality and may be determined based on an average SNR of a predetermined number of received signals, which may be the four strongest signals received from the positioning satellites 110A-N in accordance with one or more implementations. The filtered average SNR signal 508 corresponds to the filtered average SNR of signals received from the positioning satellites 110A-N. A fitted width, corresponding to differences in SNR of the four strongest signals, determines the lower boundary 504 below the filtered average SNR signal 508 and the upper boundary 506 above the filtered average SNR signal 508. At the first transition 510, the average SNR signal 502 drops below the lower boundary 504, which indicates a transition from outdoors to indoors. At the second transition 512, the average SNR signal 502 rises above the upper boundary 506, which indicates a transition from indoors to outdoors. Although FIG. 5 depicts detection of outdoor-indoor transitions based on SNR, the subject system may also detect changes in environment using other methods and/or other information.

Figure 6:
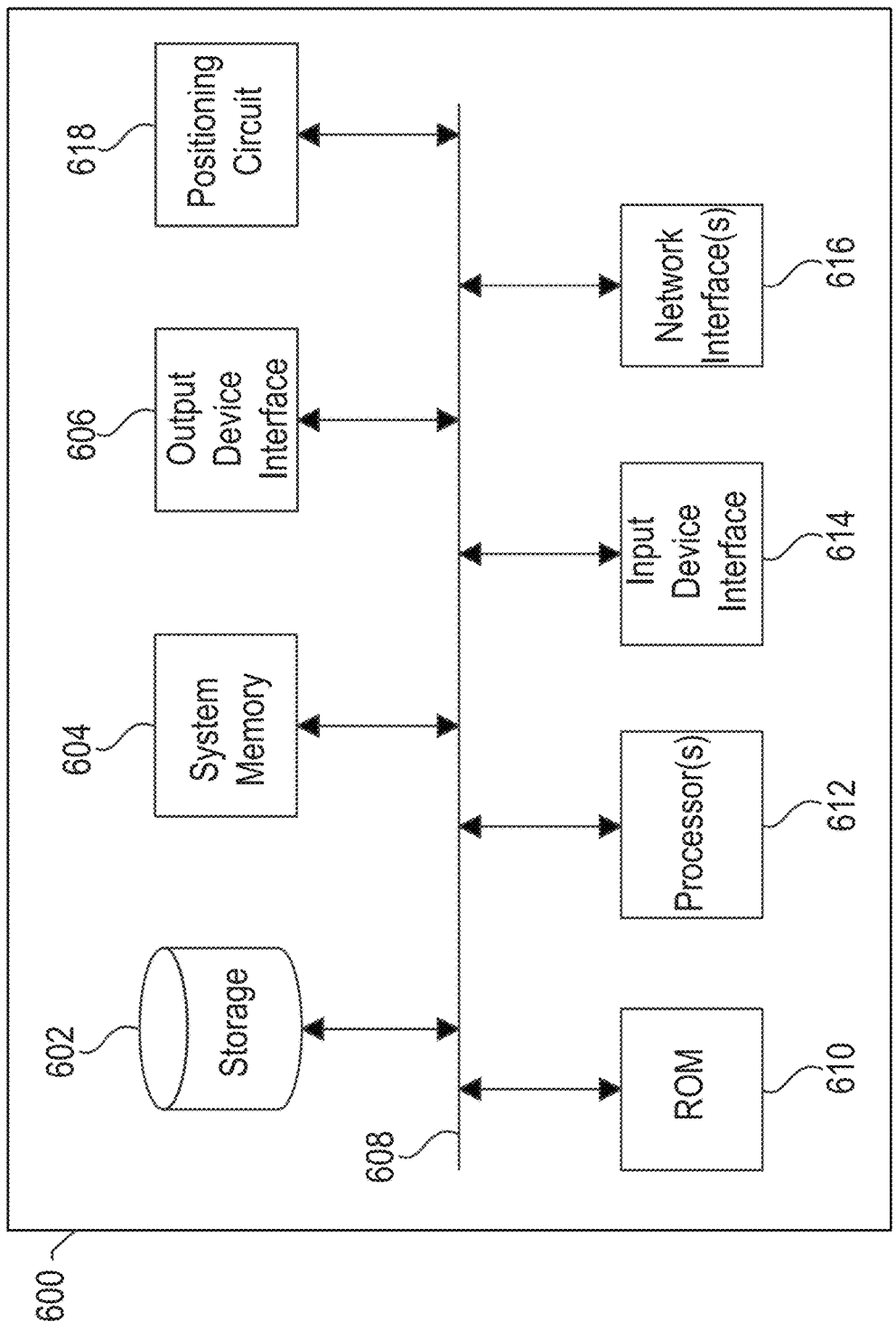
FIG. 6 conceptually illustrates an electronic system with which any implementations of the subject technology are implemented.

FIG. 6 conceptually illustrates an electronic system 600 with which one or more implementations of the subject technology may be implemented. The electronic system 600, for example, can be a desktop computer, a laptop computer, a tablet computer, a station, a server, a switch, a router, a base station, a receiver, a phone, a user equipment, a wearable device, such as a smartwatch, or generally any electronic device that transmits signals over a network. Such an electronic system 600 includes various types of computer readable media and interfaces for various other types of computer readable media. The electronic system 600 includes a bus 608, one or more processor circuit(s) or processing unit(s) 612, a system memory 604, a read-only memory (ROM) 610, a permanent storage device 602, an input device interface 614, an output device interface 606, a network interface 616, and a positioning circuit 618, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system. The permanent storage device 602, on the other hand, is a read-and-write memory device. The permanent storage device 602 is a non-volatile memory unit that stores instructions and data even when the electronic system 600 is off. One or more implementations of the subject disclosure use a mass-storage device (such as a magnetic or optical disk and its corresponding disk drive) as the permanent storage device 602.

Other implementations use a removable storage device (such as a floppy disk, flash drive, and its corresponding disk drive) as the permanent storage device 602. Like the permanent storage device 602, the system memory 604 is a read-and-write memory device. However, unlike the permanent storage device 602, the system memory 604 is a volatile read-and-write memory, such as random access memory. System memory 604 stores any of the instructions and data that the one or more processing unit(s) 612 needs at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input device interface 614 and the output device interface 606. The input device interface 614 enables a user to communicate information and select commands to the electronic system. Input devices used with the input device interface 614 include, for example, alphanumeric keyboards and pointing devices (also called "cursor control devices"). The output device interface 606 enables, for example, the display of images generated by the electronic system 600. Output devices used with the output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 608 also couples the electronic system 600 to one or more networks (not shown) through one or more network interfaces 616. In this manner, the computer can be a part of one or more network of computers (such as a local area network ("LAN"), a wide area network ("WAN"), or an Intranet, or a network of networks, such as the Internet. Any or all components of the electronic system 600 can be used in conjunction with the subject disclosure.

Finally, as shown in FIG. 6, the bus 608 also connects to the positioning circuit 618. The positioning circuit 618 may include, for example, a GNSS circuit that is configured to receive positioning signals from one or more positioning satellites, such as, e.g. GPS satellites, GLONASS satellites, Galileo satellites, BeiDou satellites, Compass satellites, or generally any GNSS satellites. The GNSS circuit may include one or more circuits, an antenna, and a highly-stable clock. In one or more implementations, the positioning circuit 618 may include one or more processing circuits, positioning circuit 618 may include and/or may be an integrated circuit and/or a system-on-a-chip. In one or more implementations, the GNSS circuit of the positioning circuit 618 may receive positioning signals, e.g. from one or more of the satellites 110A-N, may determine position data of the electronic system 600 based on the received positioning signals, and/or may provide the positioning signals to the one or more processor units 612 and/or another component of the electronic system 600. The positioning circuit 618 may also be configured to determine position data of the electronic system 600 based on positioning systems that do not rely upon positioning signals, such as PDR or WiFi positioning systems. For example, the positioning circuit 618 may include one or more sensors, such as one or more accelerometers, rate gyroscopes, magnetometer, compasses, and the like. The positioning circuit 618 may be configured to concurrently implement multiple different positioning systems and/or a subset of the multiple different positioning systems.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   concurrently implementing, by a device comprising at least one processor, a first positioning system that generates first positioning information items and a second positioning system that generates second positioning information items;
   buffering at least some of the first positioning information items generated by the first positioning system and at least some of the second positioning information items generated by the second positioning system;
   determining a position estimation for the device based at least in part on at least one of the second positioning information items generated by the second positioning system;
   detecting a degradation in a quality of the second positioning system;
   in response to detecting the degradation in the quality of the second positioning system, determining a change from a prior environment to a current environment;
   selecting the first positioning system based on the determined change and determining the position estimation for the device based at least in part on at least one of the buffered first positioning information items generated by the first positioning system; and
   periodically updating the first positioning system based on the second positioning information items generated by the second positioning system when a signal strength of at least one positioning signal received via the second positioning system satisfies a signal strength threshold.

2. The method of claim 1, further comprising:
   in response to detecting the degradation in the quality of the second positioning system, determining the position estimation for the device based at least in part on at least one of the buffered first positioning information items and a previous position estimation that was determined for the device based at least in part on at least one of the second positioning information items prior to detecting the degradation in the quality of the second positioning system.

3. The method of claim 1, wherein the second positioning system comprises a satellite positioning system.

4. The method of claim 3, wherein the degradation in the quality of the second positioning system is detected based at least in part on a signal strength of at least one positioning signal received via the satellite positioning system.

5. The method of claim 3, wherein the first positioning system comprises a dead reckoning positioning system and the method further comprises:
   in response to detecting the degradation in the quality of the second positioning system:
      initializing the dead reckoning positioning system using a previous position estimation for the device determined by the satellite positioning system prior to detecting the degradation in the quality of the second positioning system; and
      updating the dead reckoning positioning system based on the buffered first positioning information items that were buffered after the previous position estimation for the device was determined.

6. The method of claim 1, wherein the second positioning system comprises a satellite positioning system and the first positioning system comprises a dead reckoning positioning system.

7. The method of claim 1, further comprising:
   determining, based on detecting the degradation in the quality of the second positioning system, a transition of the device from an outdoor environment to an indoor environment.

8. The method of claim 1, wherein the first positioning system utilizes a first filter that generates first states of the first positioning system and the second positioning system utilizes a second filter that generates second states of the second positioning system.

9. The method of claim 8, wherein buffering the at least some of the first positioning information items generated by the first positioning system comprises buffering at least some of the first states of the first positioning system generated by the first filter.

10. A device comprising:
    at least one processor configured to:
       concurrently implement a plurality of positioning systems;
       select a first positioning system of the plurality of positioning systems based at least in part on a current environment in which the device is located and based on a detected degradation of quality of a second positioning system of the plurality of positioning systems in a prior environment;
       determine a first state of a plurality of states generated by the second positioning system of the plurality of positioning systems prior to the detected degradation of quality occurred; and
       determine position information for the device based at least in part on the first state generated by the second positioning system of the plurality of positioning systems and at least one state of the plurality of states generated by the selected first positioning system of the plurality of positioning systems subsequent to the first state being generated by the second positioning system of the plurality of positioning systems.

11. The device of claim 10, wherein each of the plurality of positioning systems utilizes one of a plurality of filters and the at least one processor is further configured to:

buffer a plurality of states generated by each of the plurality of filters of each of the plurality of positioning systems.

12. The device of claim 11, wherein the at least one processor is further configured to:
   detect the degradation of quality of the second positioning system of the plurality of positioning systems in the prior environment based on the plurality of states generated by the second positioning system of the plurality of positioning systems;
   determine, based on detecting the degradation, a change from the prior environment to the current environment; and
   select the first positioning system of the plurality of positioning systems based on the determined change.

13. The device of claim 12, wherein the at least one processor is further configured to:
   disregard at least one other state of the plurality of states generated by the second positioning system of the plurality of positioning systems subsequent to the determined first state.

14. The device of claim 10, wherein the first positioning system comprises a dead reckoning positioning system and the second positioning system comprises a satellite positioning system.

15. The device of claim 10, wherein each of the plurality of positioning systems comprises a different positioning system.

16. A computer program product comprising instructions stored in a tangible computer-readable storage medium, the instructions comprising:
   instructions to concurrently implement a plurality of positioning systems comprising a first positioning system and a second positioning system;
   instructions to buffer a plurality of states generated by each of the plurality of positioning systems;
   instructions to detect a degradation of quality of the second positioning system of the plurality of positioning systems in a prior environment;
   instructions to determine a first state of the plurality of states generated by the second positioning system of the plurality of positioning systems before the degradation of quality occurred and to disregard at least one state of the plurality of states that was generated by the second positioning system of the plurality of positioning systems subsequent to generating the determined first state;
   instructions to select the first positioning system of the plurality of positioning systems based at least in part on a determined change from the prior environment to a current environment; and
   instructions to determine position information based at least in part on the plurality of states generated by the selected first positioning system of the plurality of positioning systems.

17. The computer program product of claim 16, wherein the instructions to select the first positioning system of the plurality of positioning systems based at least in part on the current environment further comprises:
   instructions to detect the degradation of quality of the second positioning system of the plurality of positioning systems in the prior environment based at least in part on at least some of the plurality of states generated by the second positioning system of the plurality of positioning system.

18. The computer program product of claim 13, wherein the first positioning system comprises a dead reckoning positioning system and the second positioning system comprises a satellite positioning system.

19. The computer program product of claim 16, wherein the instructions to determine the position information further comprises:
   instructions to determine at least one state of the plurality of states generated by the selected first positioning system of the plurality of positioning systems subsequent to the first state being generated by the second positioning system of the plurality of positioning systems; and
   instructions to determine the position information based at least in part on the first state generated by the second positioning system of the plurality of positioning systems and the at least one state generated by the selected first positioning system of the plurality of positioning systems.

20. The computer program product of claim 16, wherein each of the plurality of positioning systems comprises a different positioning system.

* * * * *

UNITED STATES PATENT AND TRADEMARK OFFICE
CERTIFICATE OF CORRECTION

PATENT NO. : 10,459,089 B2
APPLICATION NO. : 15/263086
DATED : October 29, 2019
INVENTOR(S) : Frank Stephen Tromp Van Diggelen et al.

Page 1 of 1

It is certified that error appears in the above-identified patent and that said Letters Patent is hereby corrected as shown below:

In the Claims

Column 16, Line 22 (Claim 18): Replace "13" with --16--.

Signed and Sealed this
Twenty-eighth Day of January, 2020

Andrei Iancu
*Director of the United States Patent and Trademark Office*